No. 774,903. PATENTED NOV. 15, 1904.
J. AMMANN.
COUPLING FOR VEHICLES, &c.
APPLICATION FILED DEC. 29, 1903.
NO MODEL.
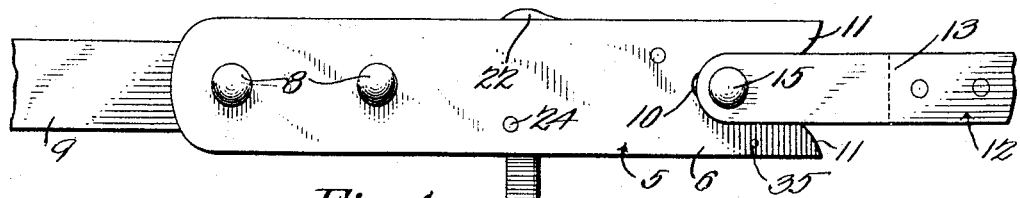
Fig. 1.
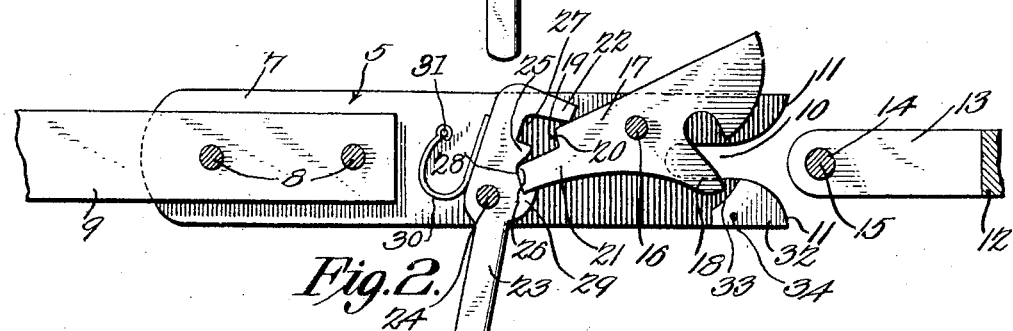
Fig. 2.
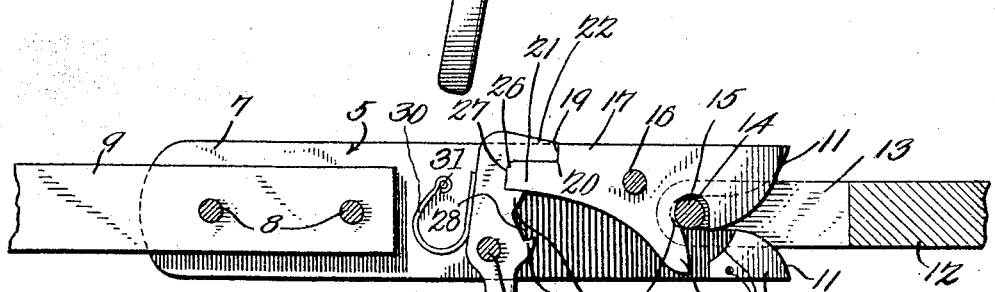
Fig. 3.
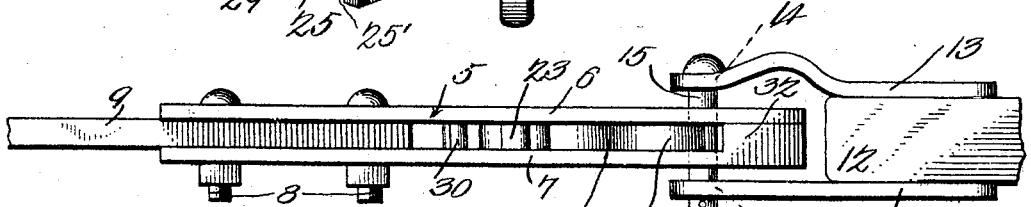
Fig. 5.
Fig. 4.
Witnesses
Joseph Ammann, Inventor.
by C. A. Snow & Co.
Attorneys No. 774,903. Patented November 15, 1904.

UNITED STATES PATENT OFFICE.

JOSEPH AMMANN, OF MAYFIELD, KANSAS.

COUPLING FOR VEHICLES, &c.

SPECIFICATION forming part of Letters Patent No. 774,903, dated November 15, 1904.

Application filed December 29, 1903. Serial No. 186,979. (No model.)

*To all whom it may concern:*

Be it known that I, JOSEPH AMMANN, a citizen of the United States, residing at Mayfield, in the county of Sumner and State of Kansas, have invented a new and useful Coupler for Vehicles, &c., of which the following is a specification.

This invention relates to an improved vehicle-coupling, particularly designed for use in connection with traction-engines for coupling threshing-machines, separators, and other vehicles to the engine or tender.

The object of the invention is to provide a simple, inexpensive, and efficient device of this character capable of being readily attached to the draw-bar of the engine and by means of which the threshing-machine or other vehicle may be automatically coupled to or uncoupled from the engine.

The invention consists in the construction and novel combination and arrangement of parts hereinafter fully described, illustrated in the accompanying drawings, and pointed out in the claims hereto appended, it being understood that various changes in form, proportion, and minor details of construction may be resorted to without departing from the principle or sacrificing any of the advantages of this invention.

In the accompanying drawings, forming a part of this specification, Figure 1 is a top plan view of a coupling constructed in accordance with my invention. Fig. 2 is a similar view with the top plates removed, showing the parts in position for coupling. Fig. 3 is a similar view showing the parts in the coupled position. Fig. 4 is a side elevation. Fig. 5 is a detail perspective view of the operating-lever.

Similar numerals of reference indicate corresponding parts in all the figures of the drawings.

5 designates the coupler, comprising a pair of spaced parallel plates 6 and 7, between the rear ends of which is secured in any suitable manner, as by bolts 8, the draw-bar 9 of a traction-engine. The forward ends of the plates 6 and 7 are bifurcated, as shown, to form a slot 10, the terminal portions of the plates adjacent the slot being curved outwardly in opposite directions, as indicated at 11, so as to permit the coupling member 12 of the threshing-machine or other vehicle to be readily introduced therein when coupling the two. The coupling member 12 preferably consists of a yoke 13, secured to the tongue of the vehicle and provided with alined openings 14, adapted to receive a pin or bolt 15. Pivotally mounted between the plates 6 and 7 of the coupler 5 in any suitable manner, as by a pin 16, is a locking or coupling hook 17, provided with a projecting arm 18, which extends across the slot 10 when the hook is in the unlocked position and receives the impact of the coupling-pin 15. The rear end of the coupling-hook is recessed, as shown at 19, defining a shoulder 20 and a reduced extension 21, said recess being adapted to receive the head 22 of a locking-lever 23, pivotally mounted on a stud 24 between the plates 6 and 7 and lock the coupling-hook in engagement with the pin or bolt 15. The locking-lever 23 is provided with a lug 25, having a cam-face 25', against which the rounded end 26 of the extension 21 bears as the arm 18 is pressed rearwardly by engagement with the coupling-pin 15, causing said lever to be forced out of the path of the coupling-hook. The lever 23 is provided with a rectangular recess 27, adapted to receive the extension 21 when the coupling-hook is in the locked position, said lever being also provided with an inclined face 28, which forms a continuation of the cam-face 25' and terminates in a shoulder 29, against which said extension rests when the hook is in the unlocked position. The locking-lever is held in engagement with the coupling-hook by means of a spring 30, one end of which rests against said lever, the opposite end thereof being mounted on a pin 31, secured in any suitable manner between the plates 6 and 7. A spacing-block 32 is secured to or formed integral with the plate 7, said block being cut away, as shown at 33, to permit pivotal movement of the coupling-hook 17. Projecting from the block 32 is a pin or lug 34, which engages an opening 35 in the plate 6 and serves as an additional means for securing the plates together.

In practice, the coupler 5 being in the position shown in Fig. 1 of the drawings, when it is desired to couple a threshing-machine, separator, or other vehicle to the traction-engine the member 12 is held stationary and in a position to permit the coupling-pin 15 to readily engage the coupling-hook when the engine is backed. As the pin 15 engages the hook it presses on the arm 18, which causes the rounded portion of the extension 21 to bear against the cam-face 25 of the locking-lever, forcing said lever rearwardly until the extension clears the lug, when the spring will force the head of the lever in engagement with the recess 19 and the extension 21 in engagement with the recess 27, thereby locking the hook and effectually preventing accidental displacement of the coupling-pin, as clearly shown in Fig. 3 of the drawings.

To uncouple the vehicles, the locking-lever is thrown forward, which releases the coupling-hook, the forward movement of the engine causing the coupling-pin to tilt the hook and automatically release the same. As the pin is released the extension engages the shoulder 29, while the head of the locking-lever engages the coupling-hook, as clearly shown in Fig. 2 of the drawings, in which position the coupler is again ready to receive the member 12. It will thus be seen that the coupling-hook is held in the open position and locked from accidental lateral displacement by engagement with the shoulder of the locking-lever, while said hook is positively locked in the closed position by engagement with the terminal head of said lever.

Having thus described the invention, what is claimed is—

1. In a coupler, the combination with a draw-bar, of a pivoted locking-hook having a fixed center of movement, and a single spring-actuated lever for locking the hook in both open and closed positions.

2. In a coupler, the combination with a draw-bar, of a pivoted locking-hook having a recess formed in the end thereof, and a single spring-actuated locking-lever adapted to engage in said recess for locking the hook in both open and closed positions.

3. In a coupler, the combination with a draw-bar, of a pivoted locking-hook having a fixed center of movement and formed with a recess in the rear end thereof, a locking-lever provided with a terminal head adapted to engage said recess for locking the hook in closed position, and means carried by the lever for locking said hook in the open position.

4. In a coupler, the combination with a draw-head, of a pivoted locking-hook having a recess formed in its rear end defining an extension, and a locking-lever having a terminal head adapted to engage the recess in the locking-hook, said lever being provided with a recess for the reception of the extension on said hook when the latter is in the locked position.

5. In a coupler, the combination with a draw-bar, of a pivoted locking-hook, and a single locking-lever provided with a terminal head adapted to engage the hook for locking the same in the closed position there being a recess formed in the lever adapted to receive the rear end of the hook for locking the latter in the open position.

6. In a coupler, a casing comprising a pair of spaced plates the ends of which are slotted, a locking-hook pivoted between said plates and provided with an arm adapted to extend across the slotted ends of the plates when said hook is in the open position, and a single lever for locking the hook in both the open and closed positions.

7. In a coupler, the combination with a draw-bar, of a pair of spaced parallel plates having their end portions slotted and curved outwardly in opposite directions, a locking-hook pivoted between said plates, a single lever for locking the hook in both the open and closed positions, and a spring interposed between the parallel plates for holding the locking-lever in engagement with the hook.

In testimony that I claim the foregoing as my own I have hereto affixed my signature in the presence of two witnesses.

JOSEPH AMMANN.

Witnesses:
J. T. SAPPENFIELD,
HERMAN AMMANN.